(12) United States Patent
Xu et al.

(10) Patent No.: US 9,342,614 B2
(45) Date of Patent: May 17, 2016

(54) ASYMMETRIC IDENTIFICATION OF INTEREST TWINS IN AN ONLINE COMMUNITY

(75) Inventors: Hao Xu, Cupertino, CA (US); Zhichen Xu, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 746 days.

(21) Appl. No.: 13/443,758

(22) Filed: Apr. 10, 2012

(65) Prior Publication Data

US 2012/0197922 A1    Aug. 2, 2012

Related U.S. Application Data

(62) Division of application No. 11/647,938, filed on Dec. 28, 2006, now Pat. No. 8,166,058.

(51) Int. Cl.
*G06F 17/30* (2006.01)
*G06Q 10/10* (2012.01)

(52) U.S. Cl.
CPC .......... *G06F 17/30899* (2013.01); *G06Q 10/10* (2013.01)

(58) Field of Classification Search
CPC ................................. G06F 17/30899
USPC ................. 707/706, 722, 713, 736, 758, 781, 707/999.006; 705/1, 9, 10, 14, 26, 80; 715/751; 709/217, 223, 225
See application file for complete search history.

(56) References Cited

U.S. PATENT DOCUMENTS

| | | | |
|---|---|---|---|
| 6,334,127 B1 | 12/2001 | Bieganski et al. | |
| 6,523,044 B1 | 2/2003 | Muramoto et al. | |
| 6,681,247 B1 | 1/2004 | Payton | |
| 7,143,066 B2 | 11/2006 | Shear et al. | |
| 2003/0014373 A1* | 1/2003 | Perge et al. | 705/80 |
| 2003/0037041 A1 | 2/2003 | Hertz | |
| 2006/0218153 A1 | 9/2006 | Voon et al. | |
| 2006/0230058 A1 | 10/2006 | Morris | |
| 2007/0072468 A1* | 3/2007 | Terrill et al. | 439/260 |
| 2007/0078849 A1 | 4/2007 | Slothouber | |
| 2007/0250500 A1 | 10/2007 | Ismalon | |

* cited by examiner

*Primary Examiner* — Syling Yen
(74) *Attorney, Agent, or Firm* — Hickman Palermo Becker Bingham LLP

(57) ABSTRACT

Techniques are described for identifying one or more "interest twins" of a user. An interest twin of a user in another user that has demonstrated interests in items that are the same as or similar to the items in which the user has demonstrated an interest. Various techniques are described for reducing the overhead in interest twin determination operations. Once the interest twins for a user have been identified, the knowledge of the interest twins may be used in a variety of ways to enhance to experience of the user. For example, a mechanism may be provided which allows the user to see a list of items in which the user's interest twins have indicated an interest.

20 Claims, 2 Drawing Sheets

ASYMMETRIC IDENTIFICATION OF INTEREST TWINS IN AN ONLINE COMMUNITY

CROSS-REFERENCE TO RELATED APPLICATIONS; PRIORITY CLAIM

This application claims benefit as a Divisional of application Ser. No. 11/647,938, filed Dec. 28, 2006,now U.S. Pat. No. 8,166,058 the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to online communities and, more specifically, to techniques for determining for members of an online community other members of the online community that have similar interests.

BACKGROUND

Many types of electronic items are available over computer networks, such as the Internet. Such items include, for example, web pages, bookmarks, tags, digital images, digital videos, etc.

Many users are interested in knowing what items are interesting to other users. Users may demonstrate an interest in an item in a variety of ways. An action that demonstrates an interest in an item is referred to herein as an interest-action.

The interest-actions that are performed by users to indicate an interest in an item often vary based on the nature of the item in which they are interested. For example, users may demonstrate an interest in a web page by retrieving the web page, following a link to the web page, creating pages that include links to the web page, bookmarking the web page, etc. As another example, users may demonstrate an interest in a tag by tagging other items (such as web pages, photos, videos) with the tag. With respect to videos, users may demonstrate an interest by following links to the videos, playing the videos or downloading the videos. These are merely some examples of the various items in which a user may be interested, and the types of ways that interests may be demonstrated.

The degree to which all users have demonstrated interest in an item is generally referred to herein as the popularity of the item. The popularity of an item may be determined by counting how many interest-actions are performed relative to the item. Once the popularity of an item has been determined, the popularity may be used as a factor in a variety of contexts. For example, a search engine may use the popularity of items as a factor in determining how to rank search results that list the items.

In addition to knowing what items are popular among the community as a whole, some users are particularly interested in knowing what items are interesting to other users that share their particular interests. To allow users to see what items are interesting to other users that share their particular interests, some systems allow users to establish a personal social network, and provide a mechanism that allows the users to see what items are interesting to other members of their personal social network.

For example, some systems allow users to designate other users as "friends", and to see lists of items on which their friends have performed interest-actions. For example, in the context of web pages, the systems may allow users to see a list of the web pages that their friends have bookmarked. In the context of tags, the systems may allow users to see a list of tags that their friends have generated, or a list of items that their friends have tagged.

A mechanism that allows a user to see those items in which "friends" are interested is particularly valuable to a user that has many friends that have similar interests to the user. However, if a user has designated few or no friends, and/or the user's designated friends do not share the same interests as the user, then such a mechanism has little value. It would be helpful to provide such "less connected" users with information about items that are interesting to other users with similar interests, even though the less connected users may not actually know who those other users may be.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
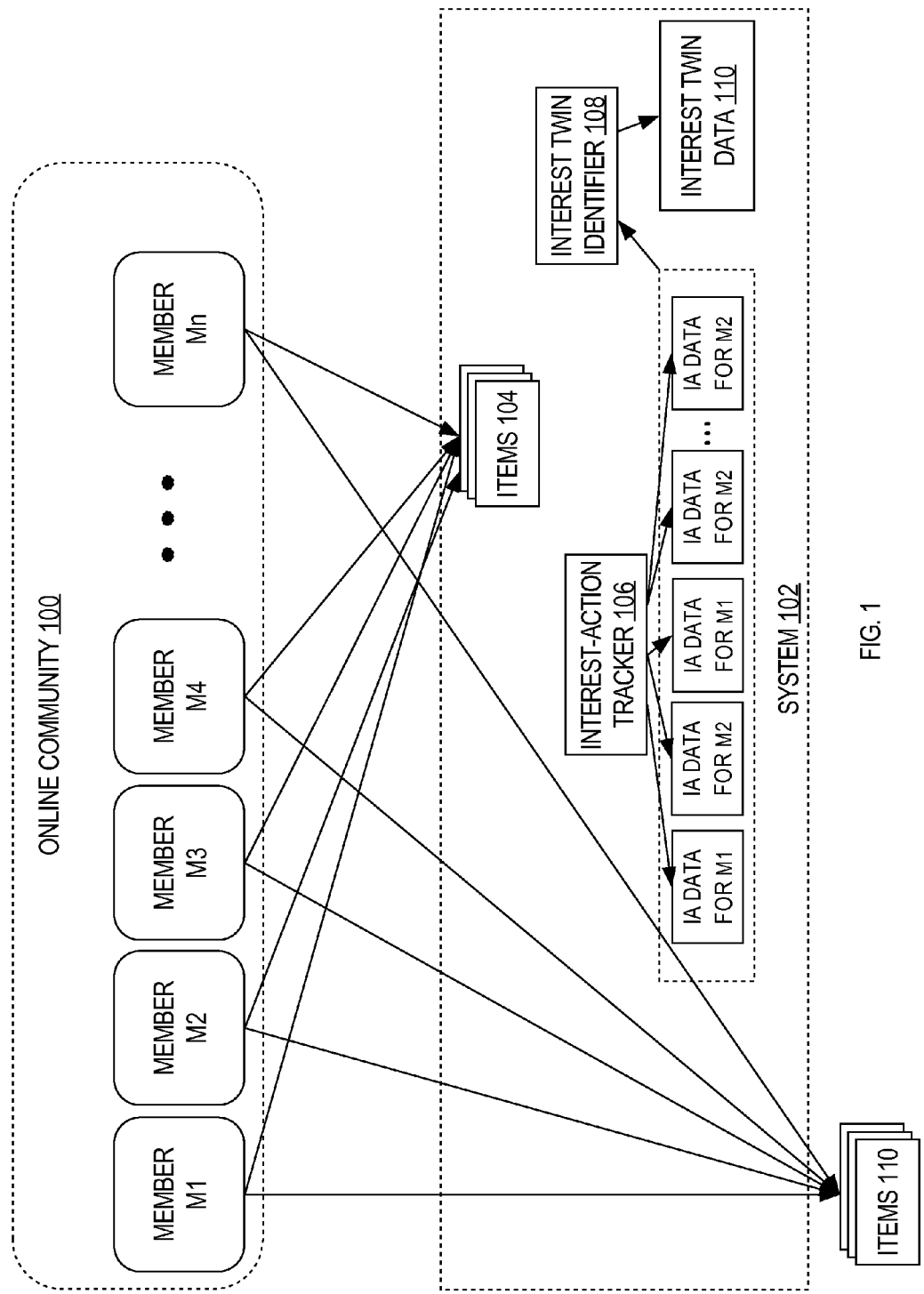
FIG. 1 is a block diagram of a system for identifying interest twins, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for identifying one or more "interest twins" of a user. An interest twin of a user in another user that has demonstrated interests in items that are the same as or similar to the items in which the user has demonstrated an interest. Once the interest twins for a user have been identified, the knowledge of the interest twins may be used in a variety of ways to enhance to experience of the user. For example, a mechanism may be provided which allows the user to see a list of items in which the user's interest twins have indicated an interest.

According to one embodiment, the interest twin relationships are established in an asymmetric manner, so that if a user X is the interest twin of another user Y, user Y is not necessarily the interest twin of user X. As shall be explained in greater detail hereafter, the asymmetry reflected by the interest twin relationships may result by considering the non-public information about a user when determining the interest twins for the user. When determining whether the user is an interest-twin of another user, the non-public information about the user is not considered.

Visibility Levels of Interest-Action Information

In some online communities, different interest-actions may be associated with different visibility levels. For example, in the context of bookmarks for web pages, some systems allow users to specify, for each bookmark operation they perform, whether the bookmark is (1) private, (2) social network visible, or (3) public. If the bookmark is private, then the system does not allow any other member of the online community to know that the user created the bookmark. If the bookmark is social network visible, then the system allows the user's designated "friends" to know that the user created the bookmark. If the bookmark is public, then the system allows all members of the online community to know that the user created the bookmark.

In the example given above, three levels of visibility (private, social network visible, and public) are described. However, a system may have any number of distinct levels of visibility. For example, in some systems, all interest-actions may simply be either private or public. In more complex systems, there may be numerous levels of visibility. For example, in some systems a user may be able to designate, for each bookmark, those specific users or user groups that are allowed to know that the user created the bookmark.

In the context of tags, a system may allow a user to explicitly specify whether the tag is public, social network visible, or private. Alternatively, the system may cause the tag to inherit the visibility level of the bookmark to the item that is assigned the tag. For example, if a user assigns a tag to an item that the user has publicly bookmarked, then the tag is treated as public. On the other hand, if the user assigns a tag to an item that the user has privately bookmarked, then the tag is treated as private.

According to one embodiment, users are permitted to create tags on items after they have bookmarked the items. When a user bookmarks an item, the user specifies the degree of visibility of the bookmark. When a user creates a tag on a bookmarked item, the tag inherits the visibility level of the user's bookmark on the item.

Asymmetric Interest Twin Determinations

When determining the interest twins of a user, information about the user is compared to information about other users. The other users that are considered when determining the interest twins of a user are referred to herein as the "interest twin candidates" for the user. The user for whom the interest twins are being determined is referred to herein as the "target user".

As shall be described in greater detail hereafter, the system performs a comparison between the interest-actions of the target user and the interest-actions of each of the interest twin candidates to identify the interest twins of the target user. According to one embodiment, interest twin determinations are made in an asymmetric manner, where the comparison takes into account more information about the target user than about each of the interest twin candidates. That is, a comparison takes into account more information about a particular user when the user is the target user of the comparison, and less information about the particular user when the particular user is the interest twin candidate of the comparison.

For example, in one embodiment, when identifying the interest twins of a particular user X, the system compares the private, social network visible and public interest-actions of user X with only the public interest-actions of each of the interest twin candidates. Conversely, when determining whether user X is an interest twin of another user, only the public interest-actions of user X are compared against the private, social network visible and public interest-actions of the other user.

According to one embodiment, when an interest twin candidate is in the social network of the target user, then the social network visible interest-actions of the interest twin candidate are also considered in the comparison, along with the public interest-action of the interest twin candidate. However, even when the interest twin candidate is in the social network of the target user, the private interest-actions of the interest twin candidate are not taken into account when determining whether the interest twin candidate is an interest twin of the target user.

Asymmetric Interest Twin Example

Asymmetrical interest twin relationships may result when different information about a user is used to determine the interest twins of the user, than is used to determine whether the user in an interest twin of others. For example, consider a community with three users A, B, and C. Assume that:

User A has performed public interest-actions relative to items 1, 2 and 3, social network visible interest-actions relative to items 4 and 5, and private interest-actions relative to items 6 and 7.

User B has performed public interest-actions relative to items 5 and 8, social network visible interest-actions relative to items 1, 2 and 7, and private interest-actions relative to item 3.

User C has performed public interest-actions relative to items 4, 5 and 6, social network visible interest-actions relative to item 7 and 8, and private interest-actions relative to items 1 and 2.

This scenario is illustrated in the following table:

|        | User A  | User B  | User C  |
|--------|---------|---------|---------|
| Item 1 | Public  | SNV     | Private |
| Item 2 | Public  | SNV     | Private |
| Item 3 | Public  | Private |         |
| Item 4 | SNV     |         | Public  |
| Item 5 | SNV     | Public  | Public  |
| Item 6 | Private |         | Public  |
| Item 7 | Private | SNV     | SNV     |
| Item 8 |         | Public  | SNV     |

Further assume that User C is in User B's social network so that User B is able to see information about User B's social network visible interest-actions.

Under these circumstances, User A's social twins are identified by:
  comparing all of User A's interests (items 1-7) to User B's public interest in items 5 and 8. (one match)
  comparing all of User A's interests (items 1-7) to User C's public interest in items 4, 5 and 6. (three matches)
Based on these comparisons, the system may conclude that User C is User A's interest twin.
  User B's social twins are identified by:
  comparing all of User B's interests (items 1-3, 5, 7 and 8) to User A's public interest in items 1-3. (three matches)
  comparing all of User B's interests (items 11-3, 5, 7 and 8) to User C's public interest in items 4, 5 and 6 (one match).

Based on these comparisons, the system may conclude that User A is user B's interest twin.

User C's social twins are identified by:
comparing all of User C's interests (items 1, 2, and 4-8) to User A's public interest in items 1-3.
comparing all of User C's interests (items 1, 2, and 4-8) to User B's public and social network visible interests in items 1, 2, 5, 7 and 8. (five matches)

Based on these comparisons, the system may conclude that User B is User C's interest twin.

Interest-Actions Used to Find Interest Twins

In general, the interest twins of a target user are identified by comparing information about the interest-actions of the target user to information about the interest-actions of other users (the interest twin candidates). The greater the overlap between the set of items in which the target user has demonstrated an interest, and the set of items in which an interest twin candidate has demonstrated an interest, the greater the likelihood that the system will determine that the interest twin candidate is an interest twin of the target user.

The specific interest-actions that are considered during the comparison, and how the interest-actions are weighted in making the interest twin determination, will vary from implementation to implementation. For example, the system that is used to establish an online community may include mechanisms for saving bookmarks to items, such as web pages, photos, etc., and
associating tags with items, such as web pages, photos, etc.

In such a system, interest twins may be determined based on similarly of items that are bookmarked by users, similarity of tags that are saved by users, or a combination of the two. Examples shall be given hereafter for embodiments that determine interest twins based on the bookmarks and tags that are saved by members of the online community. However, the techniques described herein are not limited to using any particular type of interest-action to determine the interest twins of users.

Example System for Identifying Interest Twins

FIG. 1 is a block diagram of a system 102 for identifying interest twins for members of an online community 100, according to an embodiment of the invention. System 102 includes an interest-action tracker 106 that keeps track of interest-actions performed by members M1-Mn of the online community 100 relative to items. The items relative to which the members perform interest-actions may be items 104 that are hosted by the system 102, items 110 that are hosted external to the system 102, or both.

The interest-action tracker 106 tracks the interest-actions on a member-by-member basis, thereby creating a set of interest-action data (IA data) for each member. In embodiments where interest-actions may have multiple visibility levels, the interest-action data maintained by the interest-action tracker 106 records the visibility level of the interest-actions, as well as an indication of the item upon which the interest-action was performed. The interest-action tracker 106 may also record additional information, such as the time at which the interest-actions are performed, and type of the interest-actions that are performed.

The system includes an interest twin identifier 108 that uses the interest-action data recorded by the interest-action tracker 106 to identify interest twins for some or all of the members of the online community 100. The techniques by which interest twin identifier 108 determines interest twins may simply involve comparing the IA data of each member to the IA data of all other members to find the best match. However, as the size of an online community grows, it becomes less practical to identify interest twins by comparing every community member's interest-action information against every other community member's interest-action information. Therefore, according to one embodiment, the interest twin identifier 108 takes various measures to reduce the overhead associated with making interest twin determinations. Such overhead-reducing measures shall be described in greater detail hereafter.

Determining Interest Twins Based on Tags

Some online community systems allow members to save tags to items. While the creation of a tag for an item indicates an interest in the item, it also indicates an interest in the tag. Thus, the tags themselves may be treated as items in which users that create the tags are demonstrating an interest.

The tags may include text that categorizes the item for the user that defined the tag. For example, assume that an online community has a collection of digital images. While browsing through the images, a user may tag images that show beach scenes with the tag "beach". Similarly, the user may tag images that show mountain scenes with the tag "mountain".

As another example, an online community may have a collection of event information. While browsing through listings of events, a user may tag events that describe concerts with the tag "concert", and events that describe seminars with the tag "seminar".

In general, the more the user uses a particular tag, the more interest the user is demonstrating in the tag. For example, the more images that a user tags with "beach", the more interested the user is demonstrating in the tag "beach". The degree to which a user has shown interest in an item is referred to as the user's "interest weight" in the item. Thus, a user that has tagged numerous images with the tag "beach" is considered to be heavily interested in the tag "beach".

Using Target Tags to Reduce Overhead

According to one embodiment, rather than compare all of the target user's tags against the all visible tags of all other users, the interest twin identifier 108 considers only a subset of the target user's tags. The subset of the target user's tags upon which the target user's interest twin determination is based is referred to herein as the "target tags".

According to one embodiment, the target tag selection process is based on the interest weight of the target user in the tag. The interest weight of the target user in a given tag is based on the amount of interest that the user has demonstrated in the tag relative to the general popularity of the tag. The general popularity of the tag may, in turn, be based on (1) how many other users have used the tag, and/or (2) how many items have been tagged with the tag. Thus, if a user has indicated a moderate level of interest in a tag, the tag may still be selected as one of the user's target tags if the tag is used by a relatively small percentage of other members, and has been associated with a relatively small percentage of items. On the other hand, the same moderate level of interest in a highly popular tag may not be sufficient to include the tag in the user's set of target tags.

Using Comparison Sets to Reduce Overhead

Instead of or in addition to considering only the target tags during the twin identification process, overhead may be further reduced by considering only a subset of the community in the comparison. The subset of users against which the target user is compared, for any given tag, is referred to herein as the target user's comparison set for that tag. A community member that is in the comparison set for a target tag is referred to as a comparison set member.

For any given tag, the comparison set for the tag may be determined based on a variety of factors. In one embodiment, the comparison set for a tag includes the N users with the heaviest interest weights for that tag. According to one embodiment, the number N of users in each comparison set varies from target tag to target tag based on the target user's relative interest in the target tag. For example, if the target user's relative interest in a target tag is relatively high, then the number of users in the comparison set for that tag may also be high. On the other hand, if the target user's relative interest in the target tag is relatively low, then the number of users in the comparison set for that tag may also be low. In one embodiment, the number of members in a comparison set never exceeds a certain specified maximum threshold. Establishing a maximum threshold for comparison sets ensures that the overhead associated with the twin identification process for any given target user does not exceed a certain threshold.

In one embodiment, tags are assigned to popularity levels based on how popular the tags are. As mentioned above, popularity may be based on both the number of users that have used the tag, and the number of items that have been tagged with the tag. The maximum threshold for the comparison set for a tag may be based on the popularity level for the tag. For example, a very popular tag may have a relatively low maximum threshold, while a less popular tag has a relatively high maximum threshold. Having lower maximum thresholds for highly popular tags is beneficial because highly popular tags tend to be less indicative of the specific interests of a user. Thus, if a target tag is a popular tag, then the comparison set for the target tag may be capped at 1000 members. On the other had, if the target tag is not a popular tag, then the comparison set for the target tag may be capped at 10,000.

Determining Composite-Tag-Twin-Scores

According to one embodiment, each comparison set member for a target tag is assigned an individual-tag-twin-score based on the relative interest weight of the target user in the target tag and the relative interest weight of the comparison set member in the target tag. If the target user's relative interest in a target tag is high and the comparison set member's interest in the target tag is high, then the individual-tag-twin-score assigned to the comparison set member is high. If the target user's relative interest in a target tag is low and the comparison set member's interest in the target tag is low, then the individual-tag-twin-score assigned to the comparison set member is low.

According to one embodiment, a composite-tag-twin-score is assigned to users based on the individual-tag-twin scores that were assigned to a user. In the case where a user is in the comparison set for a single target tag of the target user, the composite-tag-twin-score for the user may be the same as the individual-tag-twin-score assigned to the user for that target tag. In the case where a user is in the comparison set for multiple target tags of the target user, the composite-tag-twin-score for the user may be computed, for example, by summing the various individual-tag-twin-scores that were assigned to the user. The summing of individual-tag-twin-scores is merely one example of how individual-tag-twin-scores may be combined to generate a composite-tag-twin score.

Identifying Tag Twins

According to one embodiment, a different set of interest twins may be determined for each type of item. Thus, a user may have one set of interest twins based on tag similarities, and a different set of interest twins based bookmarking similarities. Interest twins that are based on tag similarities are referred to herein as "tag twins". Interest twins that are based on bookmarking similarities are referred to herein as "bookmarking twins". In alternative embodiments, each user has one set of interest twins that are determined based on similarities between all types of interest-actions that are monitored by the system.

In a system that determines tag twins, the tag twins of the target user may be determined by ranking other users based on their composite-tag-twin scores. The users with the top N composite-tag-twin scores may then be established as tag twins of the target user.

Storing Tag Twin Candidates

During the tag twin determination process for a user, the number of users selected as tag twins is relatively small when compared to the number of users that were ranked to make the determination. According to one embodiment, the system not only identifies the top N users as tag twins for a user, the system also stores the top M users as tag twin candidates for the next tag twin determination operation for that user. In such embodiments, M will typically be significantly greater than N. For example, five users may be selected as tag twins for a target user, while 5,000 users are stored as tag twin candidates for the user.

In a subsequent tag twin determination for the same target user, the system may read the stored information about tag twin candidates, and only consider those tag twin candidates during the subsequent tag twin determination for that target user. Limiting the tag twin identification operation to the stored set of tag twin candidates significantly reduces the overhead required by the tag twin identification operation. Further, limiting the tag twin operation to the stored tag twin candidates is not likely to have an adverse impact on the quality of the subsequent determination, since the numbers that would qualify as a user's current tag twins are very likely to be in the previously generated set of tag twin candidates.

Determining Interest Twins Based on Bookmarks

When a user bookmarks a web page, the system typically saves a URL of the web page. Once the URL has been saved, the user can use the bookmark to initiate a request for the item identified by the URL. Bookmarking a URL demonstrates an interest in the specific item associated with the URL. Consequently, when users bookmark the same URL, they demonstrate similarity of interests.

Bookmarking a URL also demonstrates an interest in the domain identified in the URL. Consequently, users that bookmark different URLs from the same domain are also demonstrating similarity of interests, but the strength of the similarity is not as strong as for users that bookmark the same URL. In other words, two users that bookmark the same URL demonstrate a greater degree of interest similarity, and two users that bookmark different URLs from the same domain demonstrate a lesser degree of interest similarity.

According to one embodiment, a user's bookmarking twins are determined in a manner similar to that described above relative to tags, except that bookmarks to different items from the same domain is treated as a partial match.

Using techniques such as those described above, comparison set members are assigned individual-bookmark-scores for each target bookmark of a target user. The individual-bookmark-scores of each other user may be combined to generate a composite-bookmark-score for the other user. The other users may then be ranked based on their respective composite-bookmark-scores, with the top N users being selected as the target user's bookmarking twins.

Instead of or in addition to using the composite-bookmarking-scores to determine bookmarking twins, the composite-bookmarking-scores may be combined with the composite-tag-scores to generate "twin scores". The other users may be ranked by their twin scores, with the top N users being selected to be the target user's interest twins.

Determining Interest Twins Based on Categories

According to one embodiment, the twin scores of interest twin candidates reflect no only "direct" matches, but also indirect matches. In example given above, bookmark scores are increased for bookmarks on different pages from the same domain. This is one example of an indirect match. In general, when the items for which users are performing interest-actions belong to categories, the fact that two items belong to the same category may cause the system to treat the items as indirectly matching items. When an interest twin candidate demonstrates interest in an item that indirectly matches a target item, the interest twin candidate's score is increased relative to that target item.

The effect that indirect matches have on an interest twin candidate's score may be the same as, or less than, the effect of a direct match. According to one embodiment, the system may support many degrees of indirect matches, where the effect of the match is determined by the degree of indirection. For example, assume that items have been assigned to a hierarchically-organized category scheme. Under those circumstances, a direct match with a target item may receive one score, a match with an item in the same specific category may receive another score, a match with an item in a broader, parent category would receive another score, etc. The further the distance, within the category hierarchy, between the categories associated target item and the item in which an interest twin candidate has expressed an interest, the less effect the indirect match has on the twin score of the interest twin candidate.

Adjustments to Twin Scores

According to one embodiment, the twin scores that are generated based on interest-action information comparisons may be adjusted based on a variety of factors prior to determining the interest twins of a target user. For example, in one embodiment, the twin scores are adjusted based on whether interest twin candidates have social network associations with the target user. For example, the twin score of an interest twin candidate that is a "friend" of a "friend" of the target user may be increased, thereby increasing the likelihood that the interest twin candidate will qualify as an interest twin.

The social network distance between an interest twin candidate and the target user may affect the degree to which the twin score of the interest twin candidate is adjusted. Thus, the twin score of a "friend" of a "friend" of a "friend" may be increased less than the twin score of a "friend" of a "friend".

Another factor that may be used to adjust scores is the timing of the interest-actions of the interest twin candidates. For example, an interest twin candidate that has recently indicated an interest in a target item would receive an individual item interest score that is higher than an interest twin candidate that indicated an interest in the target item in the distant past.

Further, the timing of the target user's interest-actions may also be taken into account. Thus, interest twin candidates that express interest in items in which the target user has recently expressed an interest will have relatively higher scores than interest twin candidates that express interest in items in which the target user has expressed an interest in the distant past.

Another factor that may be used to adjust twin scores is the reputation, within the online community, of the interest twin candidate. Different online communities may use different techniques to determine reputation scores for their members. The present invention is not limited to any particular reputation score determination technique. Interest twin candidates that have relatively high reputation scores may have their twin scores increased, while interest twin candidates with relatively low reputation scores may have their twin scored decreased. According to one embodiment, interest twin candidates that have reputation scores below a given threshold are simply disqualified from being the interest twin of other members of the community, regardless of how high their twin scores would otherwise be.

Example Uses of Interest Twin Information

Once a set of one or more interest twins have been identified for a particular user, the interest twin information may be used in any number of ways to improve the experience of the user. For example, the user may be presented with a web page that identifies the interest twins of the user, and includes a control associated with each of the interest twins. In response to user input that selects a control associated with an interest twin, the system may generate a web page that identifies items in which the interest twin that is associated with the selected control has demonstrated an interest. For example, if a user selects a control associated with interest twin X, then the system may generate and present to the user a web page that lists web pages that have been bookmarked by interest twin X. The list may include all web pages bookmarked by the interest twin X, or be limited to only those web pages that have been recently bookmarked by the interest twin X.

As another example, search engines may make use of the interest twin information in a variety of ways. For example, when the results of a search performed by a particular user includes web pages that were bookmarked by interest twins of the user, the ranking of those items within the search results may be increased. As another example, the ranking may be unaffected, but the search results web page may give some other indication of which items, within the search results, were of interest to the user's interest twins. For example, the search results web page may highlight the listing of those items that were of interest to the user's interest twins. Alternatively, the search results web page may list, next to each item, any interest twin that has demonstrated an interest in the item.

According to one embodiment, users can provide feedback based on their identified tag twins. For example, if a user has little interest in the items that are of interest to tag twin X, then the user may provide feedback that indicates that tag twin X is a bad match. In response to the feedback, the system may remove tag twin X from the user's identified tag twins. In addition, the system may remove tag twin X from the user's stored list of tag twin candidates, to prevent tag twin X from being selected as a tag twin in the future. The system may also reduce the twin scores of interest twin candidates that expressed interest in the same items as tag twin X.

On the other hand, a user may provide feedback that indicates that a tag twin Y is a good match. In response to the feedback, the system may increase the twin scores of interest twin candidates that expressed interest in the same items as tag twin Y.

Selecting Members for Interest Twin Operations

Members that are very active in the online community may have large social networks within the community. Because their social networks are large, they are more likely to know what items are of interest to them, and are better able to discover new items that are of interest to themselves based on the items that are interesting to their friends. On the other hand, members that are less active in the community, and have relatively small social networks, are in greater need of a mechanism to help them identify additional items in which they may be interested. Therefore, according to one embodiment, the interest twin identifier 108 is configured to reduce overhead by (1) identifying those members of the community that are most likely to benefit from the identification of interest twins, and (2) perform the interest twin identification operations for only those members.

For example, in one embodiment, the interest twin identifier may be configured to only perform search twin identification operations for those members of the community with fewer than three designated friends. As another example, the interest twin identifier may be configured to only perform interest twin identification operations for those members of the community that have tagged fewer than ten items, or that have saved fewer than twenty bookmarks.

In one embodiment, a user's reputation is used as a factor to determine whether to expend the computational resources required to identify the interest twins of the user. For example, users with reputations that fall before a certain threshold may be excluded from the search twin identification process regardless of whether the other factors would otherwise cause them to be included.

In some embodiments, tag twins are determined for all users. However, the timing of the determination varies based on how useful the identification of interest twins would be for the users. Thus, the system may determine tag twins for users that are very active, and that have large social networks, on a very infrequent basis. In contrast, the system may determine tag twins for users that are less active, and that have small social networks, frequently.

Hardware Overview

Figure 2:
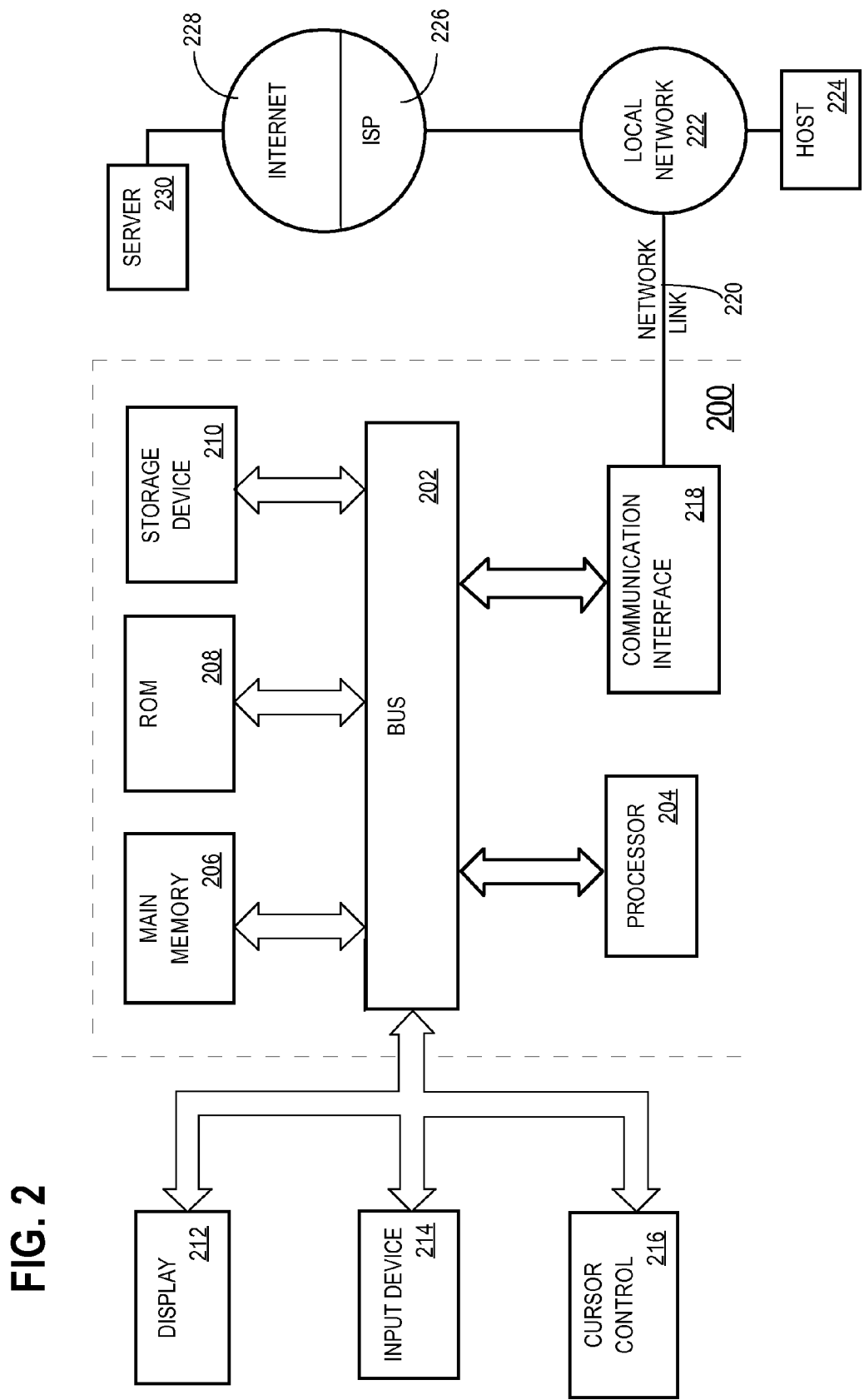
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for identifying members of an online community that have interests similar to other members of the online community, the method comprising:

receiving at least a portion of a first superset of data about a first user from one or more physical devices operated by the first user;

receiving at least a portion of a second superset of data about a second user from one or more physical devices operated by the second user;

storing the first superset of data about the first user and the second superset of data about the second user, wherein the first superset of data includes a first subset of data that includes less than all of the first superset, and wherein the second superset of data includes a second subset of data that includes less than all of the second superset;

determining, by one or more computing devices that have access to both the first superset of data and the second superset of data, whether the first user is an interest twin of the second user based on a comparison between the first subset and the second superset without considering information from the first superset that does not belong to the first subset;

based on the comparison between the first subset and the second superset, determining that the first user is an interest twin of the second user;

determining, by said one or more computing devices that have access to both the first superset of data and the second superset of data, whether the second user is an interest twin of the first user based on a comparison between the second subset and the first superset without considering information from the second superset that does not belong to the second subset;

based on the comparison between the second subset and the first superset, determining that the second user is not an interest twin of the first user;

wherein the method is performed by said one or more computing devices.

2. The method of claim 1 wherein:

the second superset of data includes information about private interest-actions performed by the second user;

the second subset of data does not include said information about private interest-actions performed by the second user;

the first superset of data includes information about private interest-actions performed by the first user; and the first subset of data does not include said information about private interest-actions performed by the first user.

3. The method of claim 2 wherein:

both the second superset of data and the second subset of data include information about public interest-actions performed by the second user; and both the first superset of data and the first subset of data include information about public interest-actions performed by the first user.

4. The method of claim 1 further comprising:

determining whether the first user is in a social network of the second user; and including information about social network visible interest-actions performed by the first user in said first subset of data if and only if the first user is in the social network of the second user.

5. The method of claim 1 further comprising:

presenting to the first user information that identifies one or more interest twins, from the online community, that have been automatically determined for the first user by comparing interest-actions performed by the first user with interest-actions performed by other members of the online community; and presenting to the second user information that identifies one or more interest twins, from the online community, that have been automatically determined for the second user by comparing interest-actions performed by the second user with interest-actions performed by other members of the online community.

6. The method of claim 5 further comprising presenting to the first user a list of items in which the one or more interest twins of the first user have demonstrated an interest.

7. The method of claim 1 further comprising presenting to the first user a list of items in which one or more interest twins of the first user have demonstrated an interest.

8. The method of claim 1 wherein at least some interest-actions performed by the second user were performed in a system that has multiple levels of visibility, and the interest-actions included in the second superset of data are based, at least in part, on which actions, performed in the system by the second user, are associated with a level of visibility that allows those interest-actions to be visible to the first user.

9. The method of claim 8 wherein, for at least one of the interest-actions of the second user, the interest-action inherits a visibility level of an item that is the target of the interest-action.

10. The method of claim 9 wherein, for at least one other of the interest-actions of the second user, the interest-action is explicitly assigned a visibility level by the second user.

11. One or more non-transitory computer-readable storage media storing instructions which, when executed by one or more processors, cause performance of a method for identifying members of an online community that have interests similar to other members of the online community, the method comprising:
  receiving at least a portion of a first superset of data about a first user from one or more physical devices operated by the first user;
  receiving at least a portion of a second superset of data about a second user from one or more physical devices operated by the second user;
  storing the first superset of data about the first user and the second superset of data about the second user, wherein the first superset of data includes a first subset of data that includes less than all of the first superset, and wherein the second superset of data includes a second subset of data that includes less than all of the second superset;
  determining, by one or more computing devices that have access to both the first superset of data and the second superset of data, whether the first user is an interest twin of the second user based on a comparison between the first subset and the second superset without considering information from the first superset that does not belong to the first subset;
  based on the comparison between the first subset and the second superset, determining that the first user is an interest twin of the second user;
  determining, by said one or more computing devices that have access to both the first superset of data and the second superset of data, whether the second user is an interest twin of the first user based on a comparison between the second subset and the first superset without considering information from the second superset that does not belong to the second subset;
  based on the comparison between the second subset and the first superset, determining that the second user is not an interest twin of the first user;
  wherein the method is performed by said one or more computing devices.

12. The one or more non-transitory computer-readable storage media of claim 11 wherein:
  the second superset of data includes information about private interest-actions performed by the second user;
  the second subset of data does not include said information about private interest-actions performed by the second user;
  the first superset of data includes information about private interest-actions performed by the first user; and
  the first subset of data does not include said information about private interest-actions performed by the first user.

13. The one or more non-transitory computer-readable storage media of claim 12 wherein:
  both the second superset of data and the second subset of data include information about public interest-actions performed by the second user; and
  both the first superset of data and the first subset of data include information about public interest-actions performed by the first user.

14. The one or more non-transitory computer-readable storage media of claim 11, wherein the method further comprises:
  determining whether the first user is in a social network of the second user; and
  including information about social network visible interest-actions performed by the first user in said first subset of data if and only if the first user is in the social network of the second user.

15. The one or more non-transitory computer-readable storage media of claim 11, wherein the method further comprises:
  presenting to the first user information that identifies one or more interest twins, from the online community, that have been automatically determined for the first user by comparing interest-actions performed by the first user with interest-actions performed by other members of the online community; and
  presenting to the second user information that identifies one or more interest twins, from the online community, that have been automatically determined for the second user by comparing interest-actions performed by the second user with interest-actions performed by other members of the online community.

16. The one or more non-transitory computer-readable storage media of claim 15, wherein the method further comprises presenting to the first user a list of items in which the one or more interest twins of the first user have demonstrated an interest.

17. The one or more non-transitory computer-readable storage media of claim 11, wherein the method further comprises presenting to the first user a list of items in which one or more interest twins of the first user have demonstrated an interest.

18. The one or more non-transitory computer-readable storage media of claim 11 wherein at least some interest-actions performed by the second user were performed in a system that has multiple levels of visibility, and the interest-actions included in the second superset of data are based, at least in part, on which actions, performed in the system by the second user, are associated with a level of visibility that allows those interest-actions to be visible to the first user.

19. The one or more non-transitory computer-readable storage media of claim 18 wherein, for at least one of the interest-actions of the second user, the interest-action inherits a visibility level of an item that is the target of the interest-action.

20. The one or more non-transitory computer-readable storage media of claim 19 wherein, for at least one other of the interest-actions of the second user, the interest-action is explicitly assigned a visibility level by the second user.

* * * * *